(12) United States Patent
Oki et al.

(10) Patent No.: US 11,461,928 B2
(45) Date of Patent: Oct. 4, 2022

(54) LOCATION ESTIMATION APPARATUS

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yutaka Oki, Ome Tokyo (JP); Manabu Nishiyama, Setagaya Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 157 days.

(21) Appl. No.: 16/799,231

(22) Filed: Feb. 24, 2020

(65) Prior Publication Data

US 2021/0074020 A1 Mar. 11, 2021

(30) Foreign Application Priority Data

Sep. 6, 2019 (JP) .............................. JP2019-162615

(51) Int. Cl.
*G06T 7/70* (2017.01)
*G06T 7/73* (2017.01)
*G06T 7/77* (2017.01)
*G06N 3/08* (2006.01)
*G06T 7/55* (2017.01)

(52) U.S. Cl.
CPC ................. *G06T 7/75* (2017.01); *G06N 3/08* (2013.01); *G06T 7/55* (2017.01); *G06T 7/77* (2017.01); *G06T 2207/20084* (2013.01); *G06T 2207/30252* (2013.01)

(58) Field of Classification Search
CPC .... G06T 7/75; G06T 7/77; G06T 7/55; G06T 2207/30252; G06T 2207/20084; G06T 2207/30241; G06T 2207/30244; G06T 7/73; G06N 3/08; G06N 3/0454
USPC ......................................................... 382/254
See application file for complete search history.

(56) References Cited

U.S. PATENT DOCUMENTS

| 8,218,943 B2 * | 7/2012 | Iwane ..................... G06F 16/78 386/248 |
| 2015/0062302 A1 | 3/2015 | Uchiyama et al. |
| 2016/0247288 A1 * | 8/2016 | Omori ...................... G06T 5/50 |
| 2018/0266830 A1 | 9/2018 | Kato et al. |
| 2018/0286056 A1 | 10/2018 | Kaino et al. |

(Continued)

FOREIGN PATENT DOCUMENTS

| JP | 2015049200 A | 3/2015 |
| JP | 2018139084 A | 9/2018 |

(Continued)

*Primary Examiner* — Jerome Grant, II
(74) *Attorney, Agent, or Firm* — Kim & Stewart LLP

(57) ABSTRACT

A location estimation apparatus includes a reliability calculation circuit, a selection circuit, and a self-location estimation circuit. The reliability calculation circuit calculates a reliability with respect to location estimation for a plurality of devices capturing a plurality of input images. The selection circuit selects one of the devices based on the reliability. The self-location estimation circuit performs self-location estimation based on the image captured by the selected device.

9 Claims, 5 Drawing Sheets

(56) References Cited

U.S. PATENT DOCUMENTS

| | | | |
|---|---|---|---|
| 2019/0035090 A1* | 1/2019 | Lasenby | G06T 7/246 |
| 2019/0220685 A1* | 7/2019 | Uchiyama | G06T 7/60 |
| 2019/0238798 A1* | 8/2019 | Liu | G08B 13/196 |
| 2020/0012877 A1* | 1/2020 | Kotake | G06K 9/00671 |
| 2020/0211224 A1* | 7/2020 | Kawabe | G06K 9/00791 |
| 2021/0027486 A1* | 1/2021 | Kaino | G05D 1/0251 |
| 2021/0264132 A1* | 8/2021 | Noest | G06K 9/00208 |

FOREIGN PATENT DOCUMENTS

| | | | |
|---|---|---|---|
| JP | 2019007739 A | | 1/2019 |
| WO | 2017057052 A1 | | 4/2017 |
| WO | 2017057054 A1 | | 4/2017 |

\* cited by examiner

LOCATION ESTIMATION APPARATUS

CROSS-REFERENCE TO RELATED APPLICATIONS

This application is based upon and claims the benefit of priority from Japanese Patent Application No. 2019-162615, filed Sep. 6, 2019, the entire contents of which are incorporated herein by reference.

FIELD

Embodiments described herein relate generally to a location estimation apparatus.

BACKGROUND

A self-location estimation technique using visual simultaneous localization and mapping (SLAM) which uses cameras mounted on the periphery of vehicles and the like has been widely studied. When a plurality of cameras is mounted, it is difficult use all the cameras in a limited computational resource environment to estimate the self-location.

DETAILED DESCRIPTION

Embodiments provide a location estimation apparatus that performs a highly stable estimation corresponding to computational resources.

In general, according to one embodiment, there is provided a location estimation apparatus that includes a reliability calculation circuit, a selection circuit, and a self-location estimation circuit. The reliability calculation circuit calculates a reliability with respect to location estimation for a plurality of devices that capture a plurality of input images. The selection circuit selects one of the devices based on the reliability. The self-location estimation circuit performs self-location estimation based on the image captured by the selected device.

Embodiments will be described with reference to the drawings. In the following description, self-location estimation for a vehicle (e.g., an automobile) will be described, but the present disclosure is not limited to this. For example, when a plurality of cameras is mounted on other devices that are not automobiles, such as robots or drones, a similar self-location estimation apparatus may be mounted on the apparatus to estimate a self-location. In one embodiment, "self-location" means a location of the vehicle or the like to which cameras that capture images for use in estimating the location, are mounted. In another embodiment, "self-location" means a location of the vehicle or the like to which cameras that capture images for use in estimating the location, are mounted, and a traveling direction of the vehicle and/or a facing direction of the cameras.

First Embodiment

Figure 1:
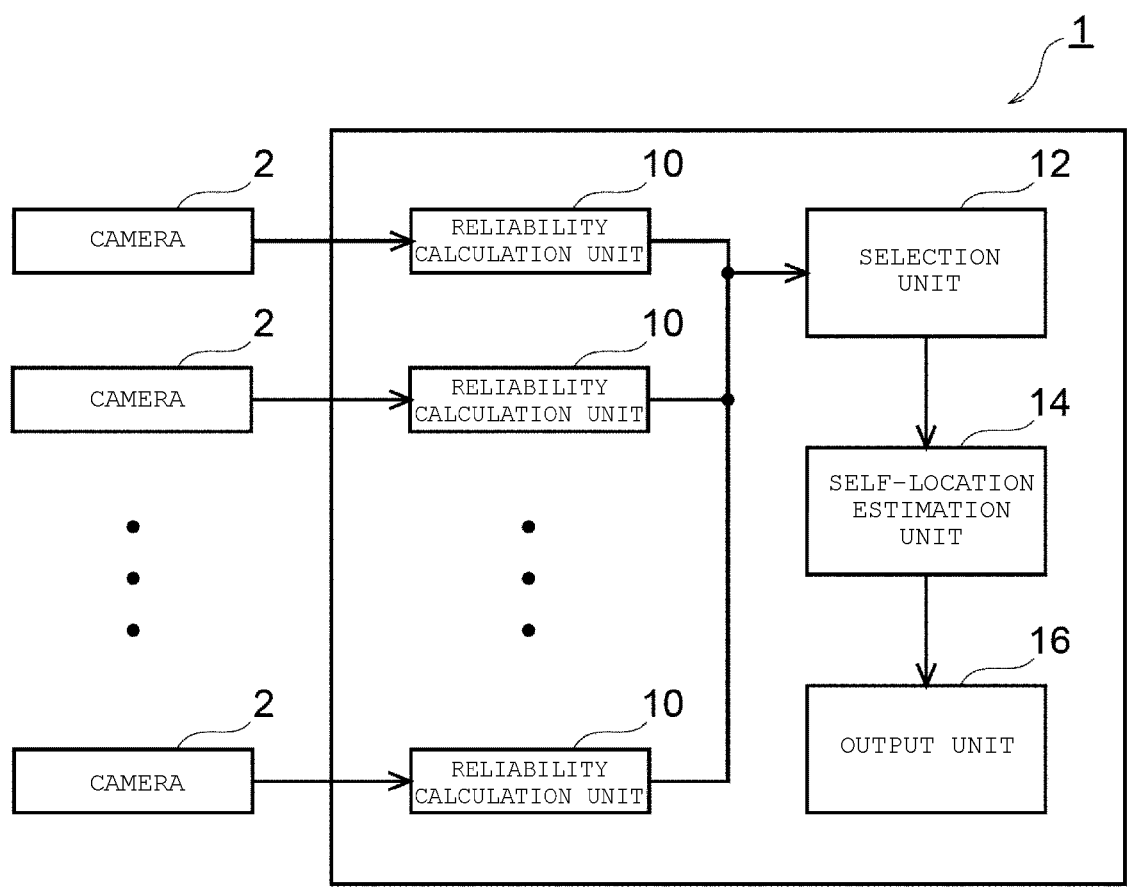
FIG. 1 is a block diagram showing functions of a location estimation apparatus according to one embodiment.

FIG. 1 is a block diagram showing functions of a location estimation apparatus according to a first embodiment. The location estimation apparatus 1 acquires images from each camera 2 provided outside or inside the location estimation apparatus 1, and estimates a location thereof. The location estimation apparatus 1 includes the following circuits, one or more of which may be implemented as a programmed processor or a dedicated hardware circuit: a reliability calculation unit 10 connected to each camera 2, a selection unit 12, a self-location estimation unit 14, and an output unit 16.

The reliability calculation unit 10 calculates reliability of input from each camera 2 that is a device for inputting an image. The reliability is calculated for each camera 2 and changed at the timing during which the self-location estimation is executed.

The selection unit 12 selects which camera 2 is used to execute the self-location estimation. The selection unit 12 is connected to the reliability calculation unit 10 corresponding to each camera 2 and selects a camera 2 to be used for self-location estimation based on the reliability output by the reliability calculation unit 10. For example, an image input from the camera 2 with high reliability is selected to be used for self-location estimation.

The self-location estimation unit 14 estimates a self-location based on the camera 2 selected by the selection unit 12. The self-location estimation unit 14 estimates the self-location from the image of the camera 2 selected by the selection unit 12 using, for example, the SLAM and structure from motion (SfM) techniques. Details regarding this technique are omitted. The present embodiment is not limited to the above technique and may be employed in any technique as long as the self-location is estimated based on the input image. In this case, the reliability calculation unit 10 calculates the reliability of each camera 2 with respect to the applied technique, and the selection unit 12 selects an appropriate camera based on the calculated reliability.

The output unit 16 outputs the self-location estimated by the self-location estimation unit 14 to the outside.

A plurality of cameras 2 are provided in a vehicle. For example, in order to acquire an image in each of the front, rear, left, and right areas of the vehicle, a camera is provided on each of the front, rear, left and right side surfaces of the vehicle. The number of the cameras 2 is not limited to four, and even when the number is smaller or larger than four, the self-location estimation can be similarly executed when a plurality of cameras is provided.

The location estimation apparatus 1 may include a storage unit (not shown) as necessary. When information processing by software of the location estimation apparatus 1 is specifically executed using a hardware resource (e.g., a processor), a program describing an operation of the software, an execution file, and the like may be stored in the storage unit. Further, for example, image data of a current frame and image data related to a frame before the current frame, or various data necessary for the self-location estimation such as parameters necessary for self-location estimation and camera parameters, may be stored in the storage unit. The storage unit is not limited to be provided inside the location estimation apparatus 1 but may be provided outside the location estimation apparatus 1 connected by a bus or the like.

A reliability calculation of the reliability calculation unit 10 will be described in detail.

FIRST EXAMPLE

The reliability calculation unit 10 extracts feature points from the input image captured by each camera 2 and calculate the reliability based on variations in the distribution of the feature points in a three-dimensional space. This is because when the variations in the distribution of the acquired feature points in the three-dimensional space are small, an error in a self-location calculation becomes large.

In the three-dimensional spatial distribution, horizontal and vertical axes of feature points can be acquired by measuring locations of the feature points in the image. On the other hand, the depth of the three-dimensional spatial distribution, that is, the distance in the optical axis direction of an imaging system of the camera 2 is estimated using a monocular depth estimation, for example. The monocular depth estimation is executed by a neural network model that is trained by machine learning including a convolutional neural network (CNN), for example. In this machine learning training, for example, in a captured image, when the captured image, which uses a feature point with known depth information as teacher data, is input, learning is performed so that the depth of the feature point is estimated.

A reliability calculation method is set so that the reliability of the camera 2 having a large variation in the three-dimensional spatial distribution of feature points is increased. As a result, the selection unit 12 selects the camera 2 having a large variation.

At this time, in the estimated three-dimensional spatial distribution, the reliability may be set so that cameras 2 having extremely close depths are not selected. A self-location measurement is performed based on a certain number, for example, a distance from a predetermined number of feature points. For example, if multiple feature points are detected for the same object, the relative distance to the object may be accurately measured but since the distance to other feature points cannot be measured accurately, the accuracy of self-location measurement is reduced. This may result in a problem when the extraction of feature points is limited to a predetermined number or the like. Though, in the extraction of feature points, the number of detected feature points for the same object may be limited.

In this way, by calculating the reliability of the camera 2 having a large variation in the three-dimensional spatial distribution of feature points to be high and selecting an image input from such camera 2 as an image used for the self-location estimation, algorithms such as SLAM or SfM may be applied to feature points with various depths. As a result, since the input image can be three-dimensionally reconstructed based on the feature points with various depths when self-movement is performed, it is possible to perform the accurate self-location estimation.

SECOND EXAMPLE

The reliability calculation unit 10 calculates the reliability of the input image captured by each camera 2 based on the detection result of the object. The object detection may use a general object detection method. As the object detection, for example, the neural network model trained by machine learning including CNN may be executed.

As a result of the object detection, for example, when one object occupies ⅔ on the screen, it is determined that the camera 2, in which the image is acquired, is close to the object and the reliability calculation unit 10 calculates the reliability to be lower than those of the other cameras so as not to select such a camera 2. As a result, the selection unit 12 can reduce the probability that such a camera is used for the self-location estimation.

The reliability calculation unit 10 may also calculate the reliability based on the number of objects, each of the distances from the camera 2 to the objects in the image, or the like so that the camera 2 that outputs an image that is useful for the self-location estimation is selected.

THIRD EXAMPLE

The reliability calculation unit 10 calculates the reliability based on a moving direction of a device (for example, a vehicle) on which the camera 2 is mounted. In general, the camera 2 is installed in a vehicle so that the installation location and imaging direction of the camera 2 are fixed. That is, the camera 2 moves in the same direction with the vehicle while imaging a predetermined range with respect to the vehicle.

In this case, in the image captured in the same direction as the moving direction of the vehicle, the feature point moves from the far side to the near side from the vehicle and disappears outside the imaging area. Therefore, even when the feature point is acquired in the image captured by the camera 2 that images the moving direction of the vehicle, it is unclear whether or not the feature point can be captured for a sufficient time for self-location estimation depending on the speed of the vehicle. On the other hand, in an image captured the direction opposite to the movement of the vehicle, the feature point moves from the near side to the far side of the vehicle and disappears to the vanishing point. From this, in the image captured by the camera 2 that captures the direction opposite to the moving direction of the vehicle, a feature point acquired at a point close to the camera 2 can be continuously captured for a sufficient time for the self-location estimation.

The above will be described more specifically. For example, according to the SfM, three-dimensional information of feature points is estimated from the feature points in a plurality of frames based on the principle of three-dimensional measurement, and the self-location is estimated using an optimization algorithm from the correspondence between the two-dimensional coordinates and the three-dimensional coordinates. For the subsequent frames, the self-location and the three-dimensional coordinates are updated by tracking the two-dimensional coordinates in which the three-dimensional coordinates are known.

In general, in the principle of three-dimensional measurement, the accuracy of estimating a far-side point is worse than the estimation of a near-side point. In an image captured in the same direction as the moving direction of the vehicle, since the feature point moves from the far side to the near side of the vehicle, the self-location estimation is continuously executed using the far-side point where the accuracy of the three-dimensional location estimation is worse. In contrast to this, when imaging the direction opposite to the moving direction of the vehicle, since the feature point move from the near side to the far side of the vehicle, the self-location estimation can be performed using a feature point with an accurate three-dimensional location estimation at an earlier stage and the estimation result can be reflected in the subsequent frames. Therefore, the estimation by the camera that images the direction opposite to the moving direction of the vehicle is more accurate than the camera that images the moving direction of the vehicle.

Further, in a vehicle, since the image changes more slowly on the rear side than on the front side when the vehicle is turning, using the camera image in the direction opposite to the movement of the vehicle also has the advantage of being able to prevent erroneous matching of the feature point.

The reliability calculation unit 10 calculates the reliability of the camera 2 installed to image the opposite side of the movement of the vehicle, to be higher than the reliability of the camera 2 installed to image the same side of the movement of the vehicle, for example. In this way, by calculating the reliability of the camera on the opposite side of the movement of the vehicle to be higher, it is possible to perform highly accurate matching based on the feature point.

In this case, the reliability calculation unit 10 may acquire, for example, switching information of a shift lever installed in vehicles or the like via a controller area network (CAN) or the like. By acquiring the shift lever switching information, the current moving direction can be acquired. Further, self-location information estimated in the past may be used. The reliability calculation unit 10 can also acquire the direction, along which the self-location estimated in the past is moving, as the moving direction.

As described above, the reliability may be calculated based not only on the front and rear directions but also on a turning direction. The reliability calculation unit 10 acquires, for example, steering rotation information via the CAN or the like or from an axle yaw rate sensor, and acquires a turning state. When the vehicle is turning, the reliability of the camera 2 imaging the rear of the vehicle may be calculated to be higher than the camera 2 imaging the front of the vehicle.

FOURTH EXAMPLE

The reliability calculation unit 10 may calculate the reliability based on the location information of the device on which the camera 2 is mounted. In general, road conditions do not change significantly during a short term. As described above, the camera 2 that can acquire many different kinds of feature points may be selected as a camera used for the self-location estimation and a more detailed self-location information estimation may be performed using, for example, the general information about the vehicle location, that is, on which road the vehicle is located.

For example, when a vehicle traveling on a certain road has traveled on the same road in the past, the camera 2 may be selected based on the reliability in the past. By storing past reliability information in the storage unit, the reliability calculation unit 10 may calculate the reliability so that the same camera 2 is selected when the vehicle is traveling in the same place. The information may be linked to map data.

Furthermore, the accuracy may be improved by accumulating reliability information obtained by the methods of the first example to the third example when the vehicle is traveling in the same place. For example, regarding the reliability of each camera, an average value of accumulated information may be used as the reliability in the present example. In another example, a weighted average or the like with increasing weight on the time axis closer to the current time may be used as the reliability in the present example. In this way, when the vehicle travels in the same place many times, the accuracy may be further improved by accumulating the information.

The self-location information is observed using, for example, a global positioning system (GPS) or other navigation system. Further, regarding the acquisition of information, it is not limited to the own device (own vehicle), and information on a plurality of other vehicles may be used. When information on other vehicles is used, a statistic based on the reliability obtained from these vehicles may be calculated. These pieces of information may be stored in a server such as a cloud server via the Internet or the like, and may be acquired and stored in the location estimation apparatus 1 at any timing.

As a specific example, self-location information is acquired using GPS in the vehicle. Based on the self-location information, the reliability of each current camera 2 of the vehicle is calculated based on the reliability calculation method of each camera 2 of the vehicle or other vehicles in the past stored in the storage unit. Further, the selection unit 12 selects the camera 2 based on the calculated reliability, and self-location estimation is executed.

Accordingly, new reliability information is determined based on reliability information previously calculated when the vehicle was traveling near or at the acquired location. By choosing a camera in this manner, it is possible to not only determine the present reliability but also to execute a more robust self-location estimation.

In the above, the first to fourth examples are shown, but these are not necessarily executed separately. For example, a plurality of these examples of reliability calculations may be used in combination. When a plurality of these examples of reliability calculations is used in combination, the reliability calculation unit 10 sets a calculation method for combining them.

For example, when all four reliability calculation results are used, an overall reliability may be expressed as: "$\alpha \times$ (reliability of three-dimensional variation of feature points (first example))+$\beta \times$(reliability of object detection result (second example))+$\gamma \times$(reliability of traveling direction (third example))+$\delta \times$(reliability of self-location information (fourth example))", and the overall reliability of each camera 2 may be calculated by appropriately determining $\alpha$, $\beta$, $\gamma$, and $\delta$. Thereafter, the camera 2 may be selected by the selection unit 12 based on the overall reliability. In one embodiment, the accuracies of the first through fourth examples are determined, and higher values are assigned to $\alpha$, $\beta$, $\gamma$, and $\delta$ according to the accuracies of the first through fourth examples, respectively (so that higher values are assigned to corresponding one of $\alpha$, $\beta$, $\gamma$, and $\delta$ for more accurate examples). Alternatively, the importance of the first through fourth examples are determined, and higher values are assigned to $\alpha$, $\beta$, $\gamma$, and $\delta$ according to the importance of the first through fourth examples, respectively (so that higher values are assigned to corresponding one of $\alpha$, $\beta$, $\gamma$, and $\delta$ for more important examples). The above expression is only an example, and the reliability calculation method of the combination is not limited to this, and any method may be used as long as the reliability can be calculated appropriately.

Figure 2:
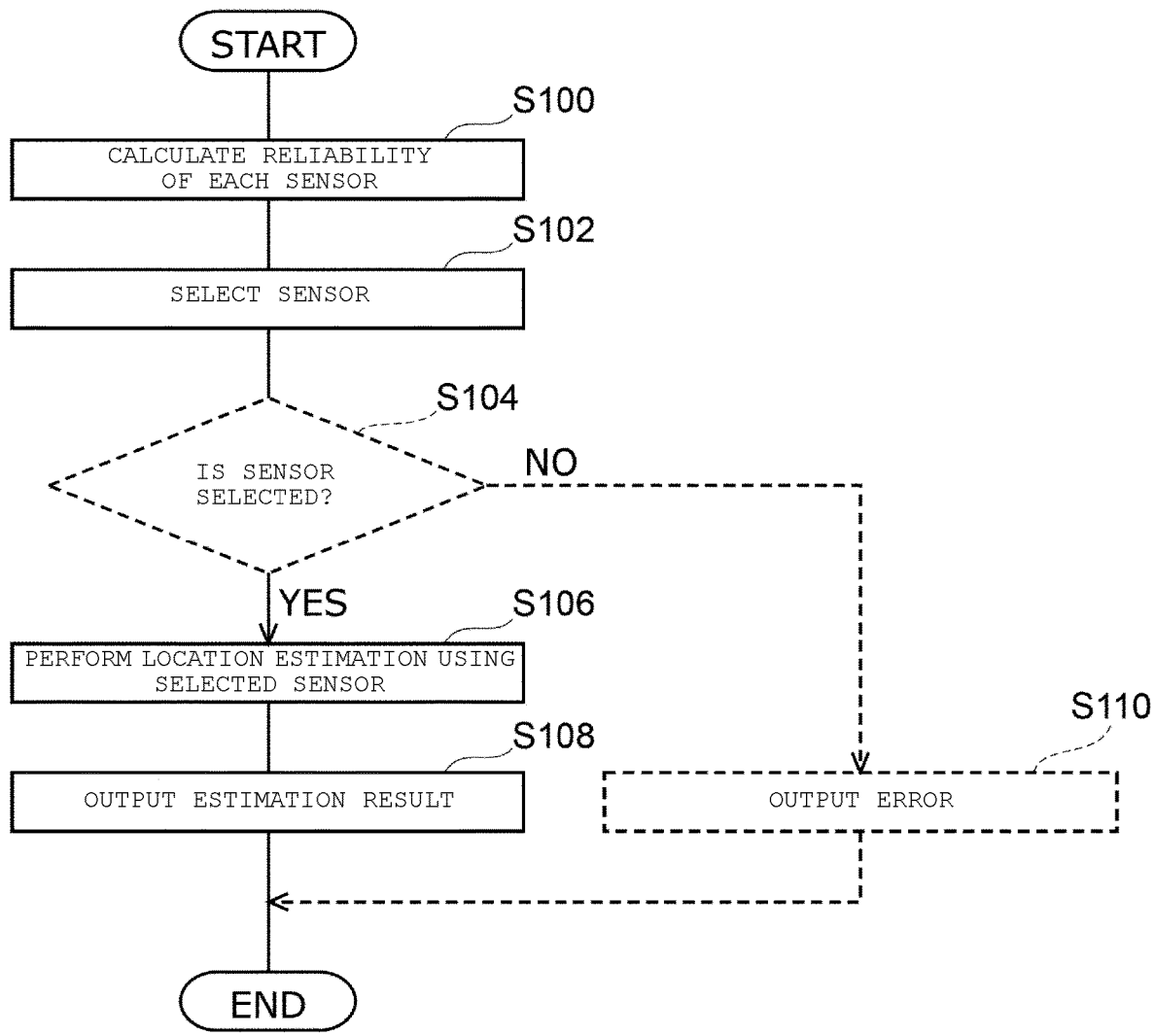
FIG. 2 is a flowchart showing processing of the location estimation apparatus according to one embodiment.

FIG. 2 is a flowchart showing a processing flow of the location estimation apparatus 1 according to the present embodiment. The processing of the location estimation apparatus 1 will be described with reference to FIG. 2.

First, the reliability calculation unit 10 calculates the reliability of the plurality of cameras 2 (S100). The calculation of the reliability may be based on, for example, at least one of the first to fourth examples. However, the calculation of the reliability is not limited to this, and the reliability may be calculated by another method. The reliability calculation unit 10 may calculate the reliability from the image for one frame using the first to fourth examples described above, or may calculate a predetermined number of pieces of frame information statistics from the current time to a time in the past as the reliability.

Next, the selection unit 12 selects a sensor that outputs an image for performing self-location estimation based on the reliability calculated by the reliability calculation unit 10 (S102). In the above example, the sensor is any one of the cameras 2.

The selection unit 12 determines whether or not there is a selectable sensor based on the reliability (S104). For example, when predetermined threshold values are set and there is a value exceeding the threshold value in the reliability calculated by the reliability calculation unit 10, it is determined that there is a sensor to be selected, and an appropriate sensor (for example, a sensor having the maximum reliability) is selected from the sensors. When there is no value exceeding the threshold value in the reliability calculated by the reliability calculation unit 10, it is determined that there is no appropriate sensor. The maximum reliability is mentioned in the above, but the present disclosure is not limited to this, and another more appropriate determination may be used.

When there is a sensor that can be selected and a certain sensor is selected (S104: YES), the self-location estimation is executed using the sensor selected by the selection unit 12 (S106). Depending on the computational resources that are available, a plurality of sensors may be selected from all sensors instead of one sensor. After the self-location estimation, the output unit 16 outputs the estimation result (S108) and the processing is ended. The output may be output to the control system of the vehicle so as to relate to the driving of the vehicle, or may be reflected on a display unit viewed by the driver, for example, a screen of a navigation system. As another example, when the reliability of none of the sensors exceeds the predetermined threshold value, the sensor selected in the previous frame may be selected again and the processing from S106 may be executed. In this way, the estimation can be continued without stopping.

When there is no sensor that can be selected (S104: NO), the output unit 16 outputs an error (S110), and the processing is ended. The error may be displayed during the normal startup, or may be displayed only at the time of factory shipment or maintenance. The error is not limited to the fact that the self-location estimation could not be performed, for example, and may be information or the like relating to the reliability of each sensor.

Further, as indicated by broken lines in the drawing, the processes of S104 and S110 are optional to the present embodiment, and can be selectively applied. That is, the processing of S104 and S110 do not have to be implemented in the location estimation apparatus 1 according to the present embodiment, and may be implemented as necessary. Furthermore, although the output is displayed on the display unit, the present disclosure is not limited to this, and a sound may be generated from a device such as a speaker, or any device may be vibrated.

As described above, according to the present embodiment, when sensors are mounted on a plurality of devices, by selecting an appropriate sensor for executing the self-location estimation from among the sensors, it is possible to execute the self-location estimation at a computational cost corresponding to a computational resource while maintaining the same accuracy and stability as information estimated when a plurality of sensors are used.

Second Embodiment

In the first embodiment described above, after the reliability is calculated for each camera 2, the camera 2 used for the self-location estimation is selected by the selection unit 12. However, in the present embodiment, the location estimation apparatus 1 includes a self-location estimation unit for each camera 2.

Figure 3:
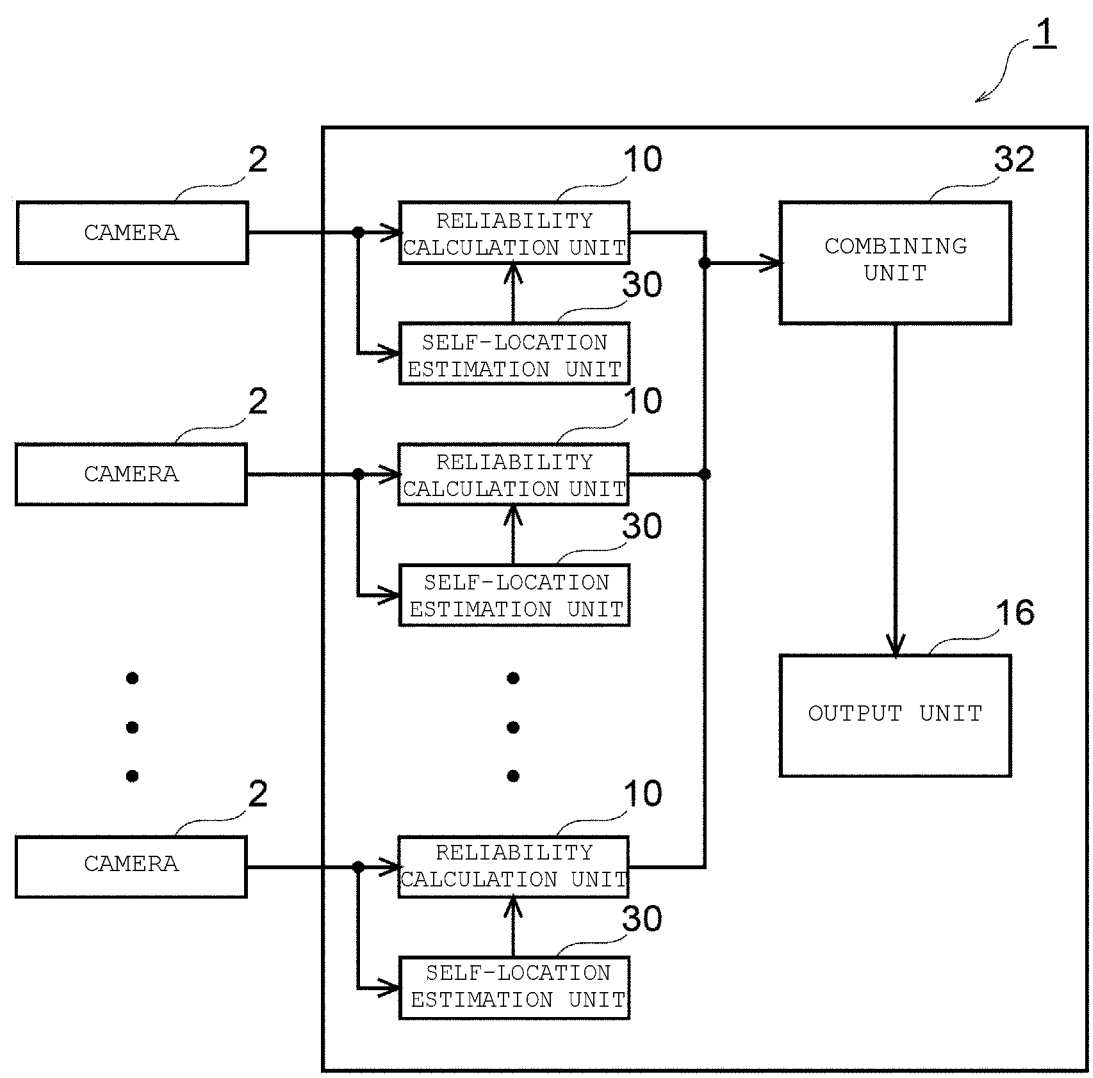
FIG. 3 is a block diagram showing functions of the location estimation apparatus according to one embodiment.

FIG. 3 is a block diagram showing functions of a location estimation apparatus 1 according to the present embodiment. The location estimation apparatus 1 includes a reliability calculation unit 10 and a self-location estimation unit 30 for each of the plurality of cameras 2, and further includes a combining unit 32 and an output unit 16. In this description of the second embodiment, elements that are assigned the same reference numerals as those in the description of the first embodiment have the same functions as those in the first embodiment, and detailed description thereof is omitted. Hereinafter, the operation of the reliability calculation unit 10 will be described with an example together with the operation of the self-location estimation unit 30.

Although the self-location estimation unit 30 is provided for each camera 2, one self-location estimation unit 30 may sequentially process data from each camera 2 and output the data to the reliability calculation unit 10.

FIFTH EXAMPLE

The self-location estimation unit 30 estimates the self-location based on the output from each camera 2. For example, the SLAM method may be used for the estimation of the self-location. The self-location estimation unit 30 estimates a translation amount x of the vehicle using, for example, the SLAM method. On the other hand, a translation amount x' of the vehicle is estimated based on the straight traveling direction and the yaw angle estimated by the SLAM. The reliability calculation unit 10 may calculate the reliability by comparing x and x'. As described above, the reliability calculation unit 10 calculates the reliability by using a self-verification method with respect to the self-location estimation result calculated by different arithmetic operations from images captured by the same camera 2.

In the above, the translation amount x of the vehicle is used, but a movement amount y of the vehicle in the vertical direction may be estimated using the SLAM method. In this case, a movement amount y' of the vehicle in the vertical direction is estimated based on the straight traveling direction and the pitch angle estimated by the SLAM. The reliability calculation unit 10 may calculate the reliability by comparing y and y'.

SIXTH EXAMPLE

In the SLAM using a monocular camera, it is difficult to know the absolute scale of the estimated translational motion alone. For example, in the case of a compound eye, an absolute scale can be calculated by comparing a plurality of feature points acquired in common in two cameras by using camera parameters or the like for each of the cameras. On the other hand, in a case of a single eye, even when a plurality of feature points are detected, there is no absolute distance to be compared, so it is difficult to calculate an absolute scale only from the movement of the feature points.

Therefore, in the frames that are captured continuously, the scale is calculated by comparing the norm of the translational motion estimated using the SLAM using the monocular camera with the vehicle speed detected by the vehicle speed sensor or the movement amount calculated using an inertial measurement unit (IMU), a global navigation satellite system (GNSS), or the like.

When the vehicle speed is used, for example, the scale can be determined by calculating a movement distance between one frame from the vehicle speed and comparing the calculated movement distance with the results of the SLAM, SfM, or the like. In this case, it is possible to set the correct scale value to one. Therefore, the stability of the scale between frames can be regarded as the reliability. For example, as the reliability, the reliability may be lowered when the scale deviates from one by a predetermined value or more. However, the reliability is not limited to this, and the reliability may be calculated as a continuous value depending on the degree in which the scale deviates from one.

When the estimation is stable, the above scale indicates one. When the estimation becomes unstable, such as when the object used for the SLAM is too close to the camera, the blurring of the scale becomes large. At this point, the reliability can be calculated by using the scale value. For example, the scale value may be calculated continuously in frames that are continuous in time series. When the frames are calculated continuously, the reliability may be calculated based on a statistic such as the dispersion of the calculated scale value. As described above, the reliability calculation unit 10 calculates a scale ratio in the images of the frames acquired at different timings in the images captured by the same camera 2, and calculates the reliability based on the scale ratio.

After the reliability calculation unit 10 calculates the reliability using each of the above examples or other methods, the combining unit 32 combines the self-location estimated by the self-location estimation unit 30 based on the output reliability and the image captured by each camera 2. Regarding the combining, for example, the location estimation results are combined based on the image output from each camera 2 based on the reliability.

Regarding the combining, for example, the reliability may be used as an average value of the self-location estimation result for those exceeding a predetermined threshold value, each self-location estimation result may be used with a weighted average based on the reliability, or other methods may be used.

Further, both the self-location estimation results of the fifth example and the sixth example may be used. In this case, one estimation result may be output for each camera 2 based on the self-location estimation results of the fifth example and the sixth example, and the estimation result may be combined over the cameras 2. As another method, the self-location estimation results of the fifth example and the sixth example may be output for each camera 2, and the combining unit 32 may combine all the two estimation results for each camera 2 together.

Figure 4:
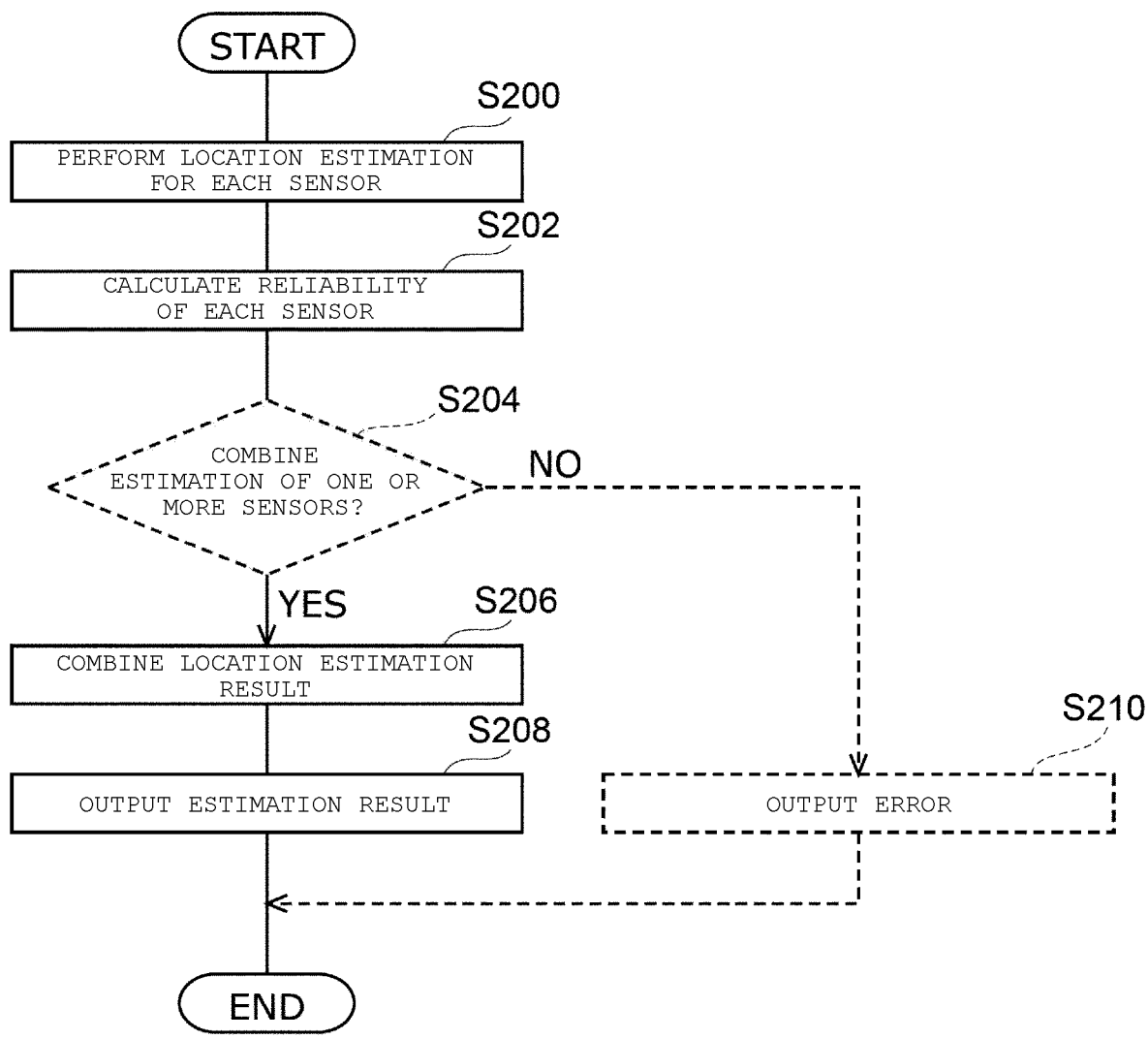
FIG. 4 is a flowchart showing processing of the location estimation apparatus according to one embodiment.

FIG. 4 is a flowchart showing a processing flow of the location estimation apparatus 1 according to the present embodiment. The processing of the location estimation apparatus 1 will be described with reference to FIG. 4.

First, the self-location estimation unit 30 executes the self-location estimation using images input from the plurality of sensors (e.g., cameras 2) (S200). For the self-location estimation, for example, a method such as SLAM or SfM may be used, or the output value of the speed sensor may be used. In addition, a yaw rate sensor or the like mounted on the axle may be used. The input from the sensor may be received via the CAN.

Next, based on the self-location estimated by the self-location estimation unit 30, the reliability calculation unit 10 calculates the reliability of each sensor (S202).

Next, the combining unit 32 determines whether or not to combine the self-location estimation results with respect to the images from one or more sensors based on the calculated reliability (S204).

When the self-location estimation results with respect to the images from one or more sensors are combined (S204: YES), the combining unit 32 combines the self-location estimation results with respect to each sensor based on the reliability (S206). The location estimation apparatus 1 outputs the self-location estimation result combined by the combining unit 32, and the processing is ended.

On the other hand, when the reliability with respect to each sensor is not sufficiently high, for example, when all of the predetermined threshold values are below, the combining unit 32 may determine that the self-location estimation result is not combined (S204: NO). In this case, the fact, in which the self-location estimation could not be performed accurately, is output as an error output via the output unit 16 (S210).

As described above, according to the present embodiment, it becomes possible to perform the self-location estimation with higher accuracy and stability by combining the self-location estimation results with the reliability using the self-location estimation results acquired in each sensor. Further, since it can be easily applied in the present embodiment even when the sensor is a monocular camera, the self-location estimation is possible by simple calculation according to the calculation resource, and the calculation cost can be reduced.

Figure 5:
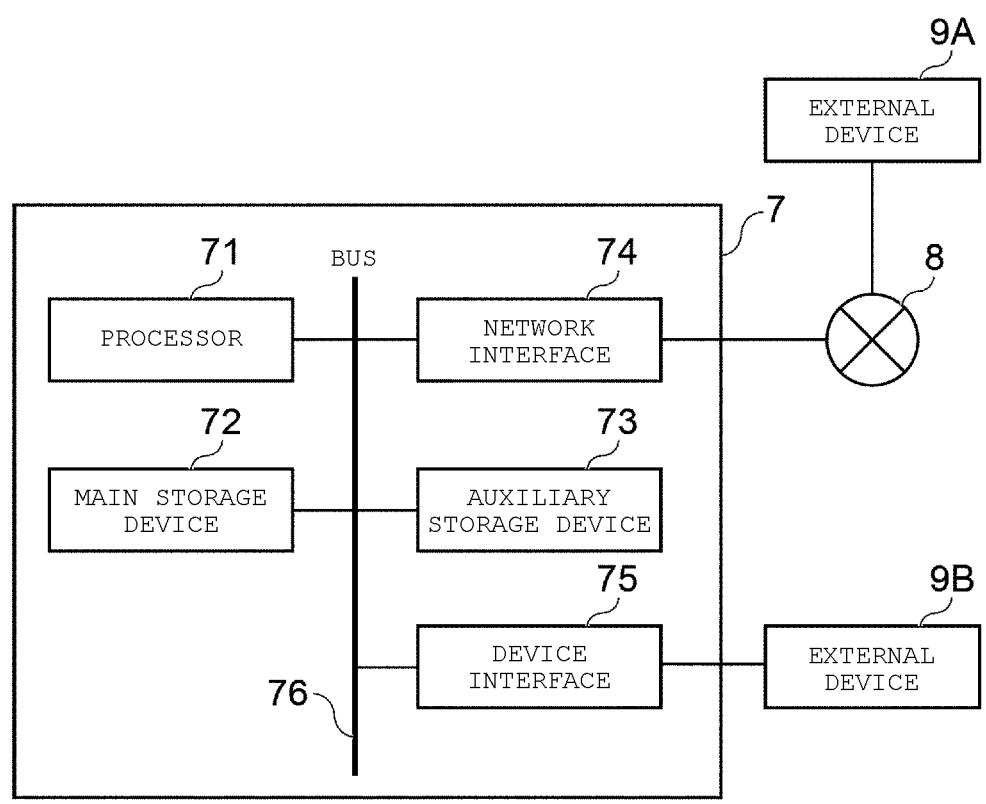
FIG. 5 is a diagram showing an implementation example of the location estimation apparatus according to one embodiment.

FIG. 5 is a block diagram showing an example of a hardware implementation of the location estimation apparatus 1 in each embodiment. The location estimation apparatus 1 is implemented by a device 7. The device 7 includes a processor 71, a main storage device 72, an auxiliary storage device 73, a network interface 74, and a device interface 75. These elements are connected via a bus 76. The device 7 may be a computer device that itself can be activated independently, or may be an accelerometer incorporated in or connected to a computer device, that is activated independently.

The device 7 in FIG. 5 includes one component for each, but may include a plurality of the same components. Further, although one device 7 is shown in FIG. 5, software may be installed in a plurality of computer devices, and each of the plurality of computer devices may execute apart of processing different in the software.

The processor 71 is an electronic circuit operating as a processing circuit including a control device and an arithmetic operation device of the device. The processor 71 performs arithmetic operation processing based on data or a program input from each device of the internal configuration of the device 7, and outputs an arithmetic operation result or a control signal to each device. Specifically, the processor 71 controls each component that make up the device 7 by executing an operating system (OS), an application, or the like of the device 7. The processor 71 is not particularly limited to any one type as long as the above processing can be performed. The location estimation apparatus 1 and each component thereof are implemented by the processor 71.

The main storage device 72 is a storage device that stores instructions executed by the processor 71 and various data, and information stored in the main storage device 72 is directly read out by the processor 71. The auxiliary storage device 73 is a storage device other than the main storage device 72. These storage devices mean any electronic component capable of storing electronic information, and may be a memory device or a storage device. The memory device includes a volatile memory and a non-volatile memory and any type of volatile memory or non-volatile memory may be used. A memory for storing various data in the location estimation apparatus 1 may be implemented by the main storage device 72 or the auxiliary storage device 73. For example, the storage unit 230 may be mounted on the main storage device 72 or the auxiliary storage device 73. As another example, when an accelerometer is further provided in the device 7, the storage unit 230 may be mounted in a memory provided in the accelerometer.

The network interface 74 is an interface for connecting to a communication network 8 by wireless or wired. The network interface 74 may be an interface that conforms to existing communication standards. The network interface 74 may exchange information with an external device 9A that is communicatively connected via a communication network 8.

The external device 9A includes, for example, a stereo camera, a motion capture, an output destination device, an external sensor, an input source device, and the like. Further, the external device 9A may be a device having apart of function of the components of the location estimation apparatus 1. And the device 7 may communicate with a part of the processing result of the location estimation apparatus 1 via the communication network 8 like a cloud service.

The device interface 75 is an interface such as a universal serial bus (USB) directly connected to an external device 9B. The external device 9B may be an external storage medium or a storage device. The storage unit 230 may be implemented by the external device 9B.

The external device 9B may be an output device. The output device may be, for example, a display device for displaying an image, or a device that outputs sound or the like. Examples include, a liquid crystal display (LCD), a cathode ray tube (CRT), a plasma display panel (PDP), and a speaker but the present disclosure is not limited thereto. Further, it may also be an automobile component controlled via the CAN.

The external device 9B may be an input device. The input device includes devices such as a keyboard, a mouse, and a touch panel, and gives information input by these devices to the device 7. A signal from the input device is output to the processor 71.

As described above, in all the descriptions above, at least a part of the location estimation apparatus 1 may be configured with hardware, or may be configured with software and the CPU or the like may be implemented by software information processing. When being implemented by the software, the location estimation apparatus 1 and a program for providing at least a part of functions thereof, may be stored in a storage medium such as a flexible disk or a CD-ROM, and may be read by a computer and executed. The storage medium is not limited to a removable medium such as a magnetic disk or an optical disk, but may be a fixed storage medium such as a hard disk device or a memory. That is, information processing by the software may be specifically implemented using the hardware resources. Furthermore, the processing by the software may be implemented in a circuit such as an FPGA and executed by the hardware.

For example, by reading out dedicated software stored in a computer-readable storage medium with a computer, the computer can be the device of the above embodiment. The type of storage medium is not particularly limited. Further, by installing the dedicated software downloaded via the communication network by the computer, the computer can become the device of the above embodiment. In this way, the information processing by the software is specifically implemented using the hardware resources.

For example, in the description of the specification, descriptions such as "or less", "or more", "less than", "more than", or the like may be rewritten as "less than", "more than", "or less", "or more", or the like, respectively.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A location estimation apparatus comprising:
    a self-location estimation circuit configured to perform self-location estimation based on a plurality of input images captured by a plurality of sensors;
    a reliability calculation circuit configured to calculate a reliability for each of self-locations estimated by the self-location estimation circuit from the plurality of input images; and
    a combining circuit configured to combine the self-locations estimated by the self-location estimation circuit based on the calculated reliabilities.

2. The location estimation apparatus according to claim 1, wherein the reliability calculation circuit calculates the reliability based on self-verification with respect to a plurality of self-location estimation results calculated by different arithmetic operations among the plurality of input images.

3. The location estimation apparatus according to claim 1, wherein the reliability calculation circuit calculates the reliability based on a scale ratio in images of frames acquired at different timings among the plurality of input images.

4. The location estimation apparatus according to claim 1, wherein
    the reliability calculation circuit is further configured to calculate a reliability with respect to each of the plurality of sensors, based on detection results of objects in the plurality of input images captured by the plurality of sensors, and
    the combining circuit is further configured to combine the self-locations estimated by the self-location estimation circuit also based on the calculated reliabilities with respect to each of the plurality of sensors.

5. The location estimation apparatus according to claim 1, the reliability calculation circuit is further configured to calculate a reliability with respect to each of the plurality of sensors, based on variation of feature points in a three-dimensional space in each of the plurality of input images captured by the plurality of sensors, and
    the combining circuit is further configured to combine the self-locations estimated by the self-location estimation circuit also based on the calculated reliabilities with respect to each of the plurality of sensors.

6. The location estimation apparatus according to claim 5, wherein the reliability calculation circuit estimates a depth in the three-dimensional space using a learned convolutional neural network.

7. The location estimation apparatus according to claim 1,
the reliability calculation circuit is further configured to calculate a reliability with respect to each of the plurality of sensors, based on a facing direction of each of the plurality of sensors by which each of the input images is captured relative to a moving direction of each of the plurality of sensors, and
the combining circuit is further configured to combine the self-locations estimated by the self-location estimation circuit also based on the calculated reliabilities with respect to each of the plurality of sensors.

8. The location estimation apparatus according to claim 1,
the reliability calculation circuit is further configured to calculate a reliability with respect to each of the plurality of sensors, based on location information of each of the plurality of sensors, and
the combining circuit is further configured to combine the self-locations estimated by the self-location estimation circuit also based on the calculated reliabilities with respect to each of the plurality of sensors.

9. The location estimation apparatus according to claim 1,
the reliability calculation circuit is further configured to calculate a reliability with respect to each of the plurality of sensors, based a combination of a variation of feature points in a three-dimensional space in each of the input images, a detection result of an object in each of the input images, a facing direction of each of the plurality of sensors relative to a moving direction of each of the plurality of sensors, and location information of each of the plurality of sensors, and
the combining circuit is further configured to combine the self-locations estimated by the self-location estimation circuit also based on the calculated reliabilities with respect to each of the plurality of sensors.

* * * * *